United States Patent [19]

Weiner

[11] 4,389,436
[45] Jun. 21, 1983

[54] FLEXIBLE FILM LAMINATE AND RETORTABLE FOOD POUCH THEREFROM

[75] Inventor: Milton L. Weiner, Rochester, N.Y.

[73] Assignee: Mobil Oil Corporation, New York, N.Y.

[21] Appl. No.: 334,763

[22] Filed: Dec. 28, 1981

[51] Int. Cl.³ ................. B65D 73/00; B65D 1/00; B32B 27/08

[52] U.S. Cl. ................................. 428/35; 206/484; 229/3.5 R; 426/113; 426/127; 426/412; 428/517; 428/520

[58] Field of Search ............... 428/517, 520, 35, 36; 206/484; 229/3.5 R; 426/113, 127, 412; 156/275.5, 275.7, 334

[56] References Cited

U.S. PATENT DOCUMENTS

| | | | |
|---|---|---|---|
| 3,182,051 | 5/1965 | Marullo et al. | 526/335 |
| 3,239,478 | 3/1966 | Harlan, Jr. | 156/334 |
| 3,300,466 | 1/1967 | Marullo et al. | 526/335 |
| 3,453,173 | 7/1969 | Isley et al. | 428/520 |
| 3,594,361 | 7/1971 | Parris et al. | 526/335 |
| 4,066,731 | 1/1978 | Hungerford | 264/216 |
| 4,072,552 | 2/1978 | Ewing | 156/275.5 |
| 4,123,576 | 10/1978 | Kobayashi et al. | 428/517 |
| 4,243,725 | 1/1981 | Wiggins et al. | 428/520 |
| 4,339,502 | 7/1982 | Gerry et al. | 428/517 |

Primary Examiner—William R. Dixon, Jr.
Attorney, Agent, or Firm—Charles A. Huggett; James F. Powers, Jr.; James P. O'Sullivan, Sr.

[57] ABSTRACT

A flexible film laminate and retortable pouch therefrom comprising a first layer of heat-sealable polyolefin film; a syndiotactic poly-1,2-butadiene adhesive be bonding said first layer to a second layer of polyacrylonitrile homopolymer film; said laminate having been subjected to conditions sufficient to effect the generation of free radicals in the system to an extent resulting in greater bond strength between layers than in the absence of said conditions.

15 Claims, No Drawings

FLEXIBLE FILM LAMINATE AND RETORTABLE FOOD POUCH THEREFROM

BACKGROUND OF THE INVENTION

This invention relates to flexible film laminates and to retortable food pouches fabricated therefrom.

Certain packaging applications, for example, retort packaging, require that the packaging material constitute a good barrier to the passage of oxygen and moisture vapor. Oriented polyacrylonitrile (PAN) film has excellent oxygen barrier properties. Its moisture barrier properties, however, are less than desirable for retort packaging. Furthermore, it is not heat-sealable to itself. Both deficiencies can be overcome by applying to one surface of the PAN a layer of a thermoplastic material having good moisture barrier properties. However, because of the significant chemical dissimilarity between PAN and thermoplastic moisture barrier polymers such as polyolefins, adhesion between the two materials is poor and package integrity suffers. It is necessary, therefore, to consider the imposition of an adhesive system between the PAN and the thermoplastic moisture barrier which will result in acting as a mutually adherent bridge between the two materials.

Prior practice of providing an adhesive bridge between PAN and an effective moisture barrier film has involved the application of an adhesive such as polyurethane or a polyester in a liquid vehicle. By this means, the adhesive is applied to the PAN and subsequently the moisture barrier film is laminated to the PAN via the adhesive. Such procedures have varying degrees of effectiveness but all include the disadvantages of employing costly adhesives and involve solvent coating with its attendant cost and environmental considerations.

In recent years, the food packaging industry has shown intense interest in the concept of pouch-packed foods which, among other advantages, do not require freezing for their preservation and can therefore dispense with costly and energy intensive refrigerated transportation and storage facilities. Much effort has gone into the development of a flexible retortable, or autoclavable, food pouch which can not only withstand the rigors of sterilization and later reheating and provide barrier properties which are sufficient to adequately protect the contents during storage, but which employs materials that are toxicologically safe.

In accordance with U.S. Pat. No. 3,453,173, a polyolefin-polyacrylonitrile laminate, which is said to possess superior heat-seal strength and excellent barrier properties to the transmission of gases and is adaptable for the construction of food containers, is prepared by bringing the polyolefin surface and the polyacrylonitrile surface together and adhering the adjacent surfaces to each other through an adhesive. Either or both surfaces can be pretreated in some manner in an effort to make them more adherent, e.g., by treatment with a gaseous mixture of boron trifluoride as described in British Pat. No. 834,196; by flame treatment or by treatment by corona discharge as described in U.S. Pat. No. 2,632,921. Among the adhesives employed in the manufacture of the laminate is ethylene-vinyl acetate copolymer described in U.S. Pat. No. 2,200,429. Because the conditions of preparation and the adhesives contemplated are not conducive to the formation of primary valence bonding, the interlaminar adhesion in boiling water would not be expected to be strong.

Resort also has been had to metallizing the PAN film in order to employ the metal layer as an effective surface through which adhesion can be accomplished to a water vapor barrier film.

SUMMARY OF THE INVENTION

In accordance with the present invention, a flexible film laminate adaptable for use in the manufacture of a retortable pouch for the packaging of food is provided which comprises:

(a) a first layer of heat-sealable polyolefin film;

(b) a syndiotactic poly-1,2-butadiene adhesive bonding said first layer to;

(c) a second layer of polyacrylonitrile homopolymer film; said laminate having been subjected to conditions sufficient to effect the generation of free radicals in the system to an extent resulting in a greater bond strength between the layers than in the absence of said conditions.

DESCRIPTION OF THE PREFERRED EMBODIMENTS

The polyolefins which are useful herein include the film-forming homopolymers and copolymers formed by the polymerization of one or more $C_2-C_8$ alpha olefins, for example, ethylene, propylene, butene-1, pentene-1, hexene-1, heptene-1, octene-1, etc. The useful polyolefins also include film-forming copolymers or one or more of the aforesaid alpha-olefins copolymerized with up to about 20 weight percent total, and preferably not more than about 5 weight percent total, of one or more other monomers copolymerizable with alpha-olefin, e.g., carbon monoxide; sulfur dioxide; acrylic acid or an acrylate ester such as methyl acrylate, amyl acrylate, hexyl acrylate, cyclohexyl acrylate, and the like; methacrylic acid or a methacrylate ester such as methyl methacrylate, ethyl methacrylate, propyl methacrylate, butyl methacrylate, amyl methacrylate, and the like; vinyl acetic acid or a vinyl ester such as vinyl formate, vinyl acetate, vinyl propionate, vinyl butyrate, vinyl benzoate, isopropenyl acetate and the like.

Procedures for the polymerization of alpha-olefins and the copolymerization of alpha-olefins with other monomers such as those recited herein are well known and do not constitute a part of this invention. The polyolefins which are useful herein can be atactic, isotactic, syndiotactic, crystalline or amorphous or a combination of any of the foregoing. The preferred polyolefin films are the homopolymers and copolymers of ethylene and propylene. Good adhesion is obtained by the present invention without subjecting the films to treatment by electric or corona discharge and/or by other means, e.g., treatment by flame, by exposure to a gaseous mixture of boron trifluoride and an oxidizing agent, etc.

The second resin layer herein is the homopolymer polyacrylonitrile (PAN). It should possess an oxygen permeability rate of less than about 10 c.c./100 $in^2$/24 hr/atm. at 100° F., more preferably less than about 1.0 c.c./100 $in^2$/24 hr/atm. at 23° C. and a water vapor transmission rate preferably less than about 50 g/100 $in^2$/24 hr. at 100° F. and 90% relative humidity, more preferably less than about 10 g/100 $in^2$/24 hr. at 100° F.

The aforesaid oxygen and water vapor transmission rates can be determined by various methods known in the art. For example, oxygen transmission rates can conveniently be measured with a Dohrmann polymeric permeation analyzer, PPA-1 (Dohrmann Envirotech Corp., Mountain View, Calif.). The Dow cell can also be employed for this purpose, in accordance with ASTM D-1434. It is preferred to use an acrylonitrile homopolymer film prepared by the polymerization and film formation methods described in U.S. Pat. No. 4,066,731 to Hungerford (Mobil Oil Corporation) which is incorporated in its entirety herein by reference.

It is to be understood that the polyolefin films contemplated herein include mixtures and blends of the polyolefin with one or more other polymers compatible therewith. Thus, for example, the polyolefin film can be prepared from a blend of from about 80 weight percent polypropylene with from about 20 weight percent polyethylene. The polymers herein can also contain other ingredients such as processing aids, plasticizers, antioxidants, reinforcers, fillers, pigments, etc., in the customary amounts.

The syndiotactic poly-1,2-butadiene contemplated as the adhesive media herein is a well known polymer. Its description and preparation is described in U.S. Pat. Nos. 3,182,051; 3,300,466; 3,594,361; etc.

Broadly, in accordance with the present invention, a layer of the syndiotactic poly-1,2-butadiene of fairly low crystallinity is interposed between the PAN film and the polyolefin moisture barrier. The resulting three layer construction is then subjected to conditions which are known to cause the formation of free radicals, for example, ultra violet radiation, or alternatively, if either the PAN or the syndiotactic poly-1,2-butadiene contains a peroxide, merely by heating. Following exposure to such conditions, the adhesion of the syndiotactic poly-1,2-butadiene to the PAN is found to be markedly enhanced. Since the syndiotactic poly-1,2-butadiene is chemically, fairly similar to the polyolefin moisture barrier layer, adhesion of these two materials can be inherently good and the polybutadiene functions to anchor the polyolefin to the PAN film. While not wishing to be bound by any theory of mechanism, it is believed that the anchoring occurs as a result of a grafting of the syndiotactic poly-1,2-butadiene to the PAN film as a result of the generation of free radicals during either the ultra violet irradiation or the thermal decomposition of a peroxide.

Any peroxide capable of generating free radicals and effecting increased bond strength is contemplated. Preferred peroxides are lauroyl peroxide, benzoyl peroxide, etc. The radiation or peroxide effect can be accomplished at a temperature of between room temperature and about 200° C., preferably about 75° C. to about 190° C.

The individual films comprising the laminate herein can be prepared in widely varying thicknesses, for example, from about 0.1 mils to about 10 mils and preferably from about 0.5 mils to abut 5 mils. The films can be assembled into the laminate employing any one or more of several conventional procedures such as those described in U.S. Pat. No. 3,453,173 which is incorporated by reference herein.

The laminates of this invention can be fabricated into retortable pouches employing known methods. In accordance with one such procedure, two super imposed layers of laminate with the heat-sealable polyolefin sides facing each other, can be edge-sealed between heated plates. The following example is further illustrative of the invention.

EXAMPLE 1

Three identical loose three-ply assemblies were prepared which comprised (a) a layer of 0.65 mil thick film of polyacrylonitrile prepared according to U.S. Pat. No. 4,066,731; (b) a second outer layer of 3.0 mil thick film of random copolymer of propylene with a minor amount of ethylene (commercially available from Exxon Corporation as EX-24); and (c) an interior layer of 0.85 mil thick film of syndiotactic poly-1,2-butadiene, 25% crystalline with a melt index at 150° C. of 3, (as commercially available from Uniroyal Corporation as RB 820).

These loose assemblies were then placed in a hot air oven at 170° C. under a steel plate producing a pressure of about 0.14 psi for a period of six minutes. They were then removed, cooled and given the treatment indicated in Table I and tested for adhesion of the PAN to the other materials by noting the force required to effect separation by peeling. The improvement after ultraviolet irradiation is unmistakable.

TABLE I

| EXAMPLE | IRRADIATION[a] TIME, Sec. | PEEL FORCE g/in. |
|---|---|---|
| Control A | 0 | 160 |
| 1 | 30, cool[b] | 407 |
| 2 | 30, hot[c] | 586 |

[a]140 Watt Hanovia UV Lamp, Type 30600, lamp to film distance 1¼ inches. PAN closest to lamp.
[b]Irradiated with film on cool composition board surface.
[c]Irradiated while supporting film on a metal plate at 170° C.

EXAMPLE 2

The low pressure laminating procedure of Example 1, though illustrating the significantly higher bonding effect as a result of the irradiation, resulted in less than ideal interlaminar contact. Identical loose structures as in Example 1 were prepared but the higher pressure of 1000 psi was employed at the temperatures indicated. As shown, excellent interlaminar contact was achieved and ultraviolet treatment resulted in even higher peeling forces than were measured on the irradiated samples of Table I.

TABLE II

| EXAMPLE | LAMINATING TEMP., °C. | IRRADIATION[a] TIME, Sec. | PEEL FORCE g/in. |
|---|---|---|---|
| Control B | 125 | 0 | 0 |
| Control C | 150 | 0 | 100 |
| 3 | 125 | 120 | 700 |
| 4 | 150 | 120 | 1500 |

[a]see footnote (a) in Table I.

EXAMPLE 3

Three identical loose three-ply assemblies, as in Example 1 were prepared except the PAN film was coated with a 0.08% solution of lauroyl peroxide in methylethylketone. After air drying the films were combined as in Example 1 and laminated in a hot air oven under a pressure of 0.14 psi for the times and temperatures shown in Table III. No ultraviolet radiation was employed. The results illustrate the significant adhesion enhancement as a result of the combined effect of heat and peroxide action.

TABLE III

| EXAMPLE | LAMINATING CONDITIONS TEMP., °C. | TIME, Sec. | PEEL FORCE g/in. |
|---|---|---|---|
| 5 | 170 | 360 | 1620 |
| 6 | 170 | 10 | 250 |
| 7 | 190 | 10 | 930 |

EXAMPLE 4

Three more sets of films, as identified in Example 1, were laminated by pressing them together for two minutes at a pressure of 1000 psi at the temperatures indicated in Table IV. The laminates were irradiated in an apparatus consisting essentially of a chamber through which the samples were transported on a variable speed belt and in which four lamps were mounted with their long axis extending perpendicularly to the direction of travel. The lamps were arranged in pairs by type. The first pair were Type H manufactured by Fusion Systems Corporation. They are 10 inches long and emit 97 watts/inch of radiation at wave lengths less than 400 nm. The second pair of lamps are manufactured by Canrod Hanovia, Cat. No. 6520A430. They are 20 inches long and emit 60 watts/inch of radiation at wave lengths less than 400 nm. Each lamp is situated at the focus of a parabolic reflector which focuses the emitted light in a ¼ inch band at the plane of the sample travel. The speed of the sample travel through the chamber is adjustable from 25 to 200 feet per minute.

TABLE IV

| LAMINATION TEMPERATURE | NUMBER OF PASSES AT 25 FEET PER MINUTE | RESISTANCE DELAMINATION g/INCH |
|---|---|---|
| 165 | 1 | 880[a] |
| 165 | 2 | 680[a] |
| 165 | 3 | 390[a] |
| 150 | 1 | 930[b] |
| 150 | 2 | 920[b] |
| 150 | 3 | 940[b] |
| 125 | 1 | 400[c] |
| 125 | 2 | 380[c] |
| 125 | 3 | 275[c] |

[a]Failure occurred between PAN and the polybutadiene.
[b]Failure occurred by PAN film breaking.
[c]Failure occurred between polybutadiene and the copolymer.

EXAMPLE 5

Another sample was made by extrusion laminating preformed rolls of 0.65 mil PAN and 3 mil EX 24 film together with the poly-1,2-butadiene. The extrusion was carried out with a ¾ inch extruder at a die temperature of 335° F. and a speed of 54–56 fpm. The thickness of the extruded layer of polybutadiene was about 0.8–0.9 mil. This laminate was irradiated with a 140 watt Hanovia lamp. Excellent adhesion resulted from this treatment. Resistance to delamination after boiling in water for one hour was still significant.

What is claimed is:

1. A flexible film laminate which comprises:
   (a) a first layer of heat-sealable polyolefin film;
   (b) a syndiotactic poly-1,2-butadiene adhesive bonding said first layer to;
   (c) a second layer of polyacrylonitrile homopolymer film; said laminate having been subjected to conditions sufficient to effect the generation of free radicals in the system to an extent resulting in a greater bond strength between layers than in the absence of said conditions.

2. The flexible film laminate of claim 1 in which the polyolefin layer is a homopolymer or a copolymer of a $C_2$–$C_8$ alpha-olefin.

3. The flexible film laminate of claim 2 in which the polyolefin layer contains up to about 20 weight percent of one or more other monomers copolymerizable with the alpha-olefin.

4. The flexible film laminate of claim 3 in which the polyolefin layer contains not more than about 5 weight percent total of one or more other monomers copolymerizable with the alpha-olefins.

5. The flexible film laminate of claim 2 in which the polyolefin layer is a homopolymer of ethylene or propylene or a copolymer of ethylene and propylene.

6. The flexible film laminate of claim 1 in which said conditions include irradiation with ultraviolet radiation.

7. The flexible film laminate of claim 6 wherein said irradiation is carried out while said laminate is at a temperature of between about room temperature and about 200° C.

8. The laminate of claim 7 wherein said temperature is between about 75° C. and about 190° C.

9. The flexible film laminate of claim 1 wherein said conditions include heating said laminate with the poly-1,2-butadiene being in the presence of an organic peroxide.

10. The laminate of claim 9 wherein said peroxide is at the interface of the poly-1,2-butadiene and the polyacrylonitrile film.

11. The laminate of claim 10 wherein the temperature is from about 75° C. to about 200° C.

12. The laminate of claim 1 wherein the individual layers range from about 0.1 to about 10 mils in thickness.

13. The laminate of claim 12 wherein each film ranges from about 0.5 to about 5 mils in thickness.

14. The laminate of claim 6 wherein said irradiation is through said polyacrylonitrile film.

15. The retortable food pouch fabricated from a flexible film laminate which comprises:
   (a) a first layer of heat-sealable polyolefin film;
   (b) a syndiotactic poly-1,2-butadiene adhesive bonding said first layer to;
   (c) a second layer of polyacrylonitrile homopolymer film; said laminate having been subjected to conditions sufficient to effect the generation of free radicals in the system to an extent resulting in a greater bond strength between layers than in the absence of said conditions.

* * * * *